(12) United States Patent
Oliphant et al.

(10) Patent No.: US 8,239,952 B1
(45) Date of Patent: Aug. 7, 2012

(54) METHOD AND SYSTEM FOR DETECTION OF REMOTE FILE INCLUSION VULNERABILITIES

(75) Inventors: Brett Oliphant, American Canyon, CA (US); Ben Tyler, Sacramento, CA (US); Gabriel Richard Pack, Napa, CA (US); Brett Hardin, American Canyon, CA (US)

(73) Assignee: McAfee, Inc., Santa Clara, CA (US)

( * ) Notice: Subject to any disclaimer, the term of this patent is extended or adjusted under 35 U.S.C. 154(b) by 1062 days.

(21) Appl. No.: 12/024,935

(22) Filed: Feb. 1, 2008

Related U.S. Application Data

(60) Provisional application No. 60/887,801, filed on Feb. 1, 2007.

(51) Int. Cl.
 *G06F 11/36* (2006.01)
 *G06F 12/14* (2006.01)
 *G08B 23/00* (2006.01)
(52) U.S. Cl. .......... 726/25; 726/22; 726/23; 726/24
(58) Field of Classification Search .......... 726/25
 See application file for complete search history.

(56) References Cited

U.S. PATENT DOCUMENTS

| 7,343,626 | B1 * | 3/2008 | Gallagher | 726/25 |
|---|---|---|---|---|
| 7,725,592 | B1 | 5/2010 | Hasegawa et al. | |
| 2003/0188194 | A1 | 10/2003 | Currie et al. | |
| 2006/0069671 | A1 * | 3/2006 | Conley et al. | 707/3 |
| 2006/0212941 | A1 * | 9/2006 | Bronnikov et al. | 726/24 |
| 2007/0074169 | A1 * | 3/2007 | Chess et al. | 717/126 |
| 2008/0120722 | A1 * | 5/2008 | Sima et al. | 726/25 |
| 2008/0148408 | A1 * | 6/2008 | Kao et al. | 726/25 |

OTHER PUBLICATIONS

Darknet, "FIS [File Inclusion Scanner] v0.1—PHP Vulnerability", Nov. 18, 2006, retreived from http://web.archive.org/web/20061118124711/http://www.darknet.org.uk/2006/09/fis-file-inclusion-scanner-v01-php-vulnerability/.*
Edge, Jake "Remote file inclusion vulnerabilities", Nov. 9, 2006, retrieved from http://web.archive.org/web/20061109205600/http://lwn.net/Articles/203904/.*

* cited by examiner

*Primary Examiner* — Matthew Henning
(74) *Attorney, Agent, or Firm* — Wong, Cabello, Lutsch, Rutherford & Brucculeri LLP

(57) ABSTRACT

A method for detecting remote file inclusion vulnerabilities in a web application includes altering of extracted resource references from a web application, submission of altered references as HTTP requests to the web application, inspection of corresponding HTTP responses, and diagnosis of vulnerability. A system of invention implements the method.

12 Claims, 4 Drawing Sheets

METHOD AND SYSTEM FOR DETECTION OF REMOTE FILE INCLUSION VULNERABILITIES

CROSS REFERENCE TO RELATED APPLICATIONS

The present application claims priority from U.S. Provisional Patent Application No. 60/887,801 filed Feb. 1, 2007, the contents of which are herein incorporated by reference in their entirety.

FIELD OF THE INVENTION

The present invention relates to computer security and, more particularly, to the detection of vulnerabilities in web applications.

BACKGROUND OF THE INVENTION

The popularity of the Internet has given rise to e-commerce. As illustrated in FIG. 1, many consumers utilize devices with Internet connectivity 102 to enjoy conveniences such as shopping at home via shopping and auction websites 104 and banking at home via on-line banking websites 104. Many other activities that formerly required live interactions either in person or via phone can be conducted on-line, such as applying for car or health insurance, buying and selling stocks, etc. via the Internet 106.

Such on-line activities typically require the exchange and storage of personal information such as credit card numbers and banking information. Accordingly, consumers want to be able to trust that the websites 104 are secure from on-line vulnerabilities, such as the ability for hackers to gain access to their personal information.

The inventions and technologies described in co-pending U.S. patent application Ser. Nos. 10/113,875 and 10/674,878, the contents of which are incorporated herein by reference, have dramatically advanced the state of the art of vulnerability detection, assessment and management. For example, these co-pending applications describe techniques for performing vulnerability scans of websites, and hosting and controlling the contents of a mark in accordance with the scan results that indicates to visitors of the website how safe the website is. These vulnerability scans aim to duplicate and/or exploit methods known to be used by hackers to attempt to gain unauthorized access to the devices and systems of the website. Nevertheless, areas of potential improvement exist.

Websites such as 104 are accessed by client software programs over the Internet via a protocol known as Hypertext Transfer Protocol (or HTTP). Using an HTTP request, a client can ask for specific content from a website and/or send user data to the website. Per the specification of the request, the website generates content and returns the content to the client via a corresponding HTTP response. A web browser (e.g. Internet Explorer) is the most common example of an HTTP client. Web browsers make HTTP requests when users type in URLs or click on links or submit forms present in the content of the website. In the specific case of submitting a form, information keyed into the form by the user is included with the HTTP request. When generating content for a response, websites often dynamically construct code based on an HTTP request; and the code is executed by a corresponding interpreter. Dynamically constructed SQL statements executed by a relational database are the most common example, but any other language and interpreter including Ruby, PHP, PERL, Python, etc. can serve.

Accordingly, many web applications employ interpreters capable of executing source code from various programming languages. Many of these languages are suited specifically for web application development and support concise programmatic directives for including source code from remote locations. These directives allow common resources to be reused and composed dynamically across a network into more elaborate constructs, eliminating redundancy in the creation of source code and in the deployment of application resources.

The ability to cause a web application to illicitly include an external resource and attempt to execute the resource as part of the application's operation is known as remote file inclusion. This class of vulnerability is potentially severe as the web application can be instructed to execute arbitrary malicious code, such as code from a hacker who wants to disrupt or surreptitiously access the web application.

For example, a web application using the popular PHP programming language might include a line of code that looks like "include $foo;". A programmer may have errantly allowed the variable "foo" to be assigned with unfiltered data from an HTTP request. A hacker, knowing or suspecting this vulnerability, may send an HTTP request to the web application, and surreptitiously include in the request a directive that re-assigns the variable "foo" to a URL controlled by the hacker and pointing to malicious code. Then, upon the next execution of the given line, the PHP interpreter will attempt to load and execute the resource of the hacker's URL, which could be potentially damaging to the website and/or its users.

Accordingly, there remains a need in the art for a method and apparatus to effectively detect vulnerabilities such as remote file inclusion.

SUMMARY OF THE INVENTION

The invention provides a method and system for detecting remote file inclusion vulnerabilities in web applications. According to certain aspects, during a security scan, references to resources are extracted from the content of a web application. The references are altered to refer to resources under control of the party conducting the security scan. In embodiments, the altered references are submitted as HTTP requests to the web application, and the corresponding responses are analyzed. The resources referenced as a result of altering the originally extracted resource references are programmatic code meaningful to various programming language interpreters of interest. The code instructs an interpreter to render, print, or otherwise output a unique identifying value or signature. Analysis of an HTTP response includes looking for evidence of execution of the external code by the web application. For example, if the signature is present in lieu of instructions to output the signature, it is determined that the code has been executed by the web application and that the web application is, therefore, vulnerable to remove file inclusion attacks.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, the invention detects server side inclusion vulnerabilities by looking for signatures embedded in content provided by its own HTTP server(s). To verify the presence of the vulnerability, the invention issues HTTP requests to the website that instruct it to dynamically include its own signature content in subsequent HTTP responses. If a signature is detected in subsequent responses, the invention concludes that the website is vulnerable.

Figure 1:
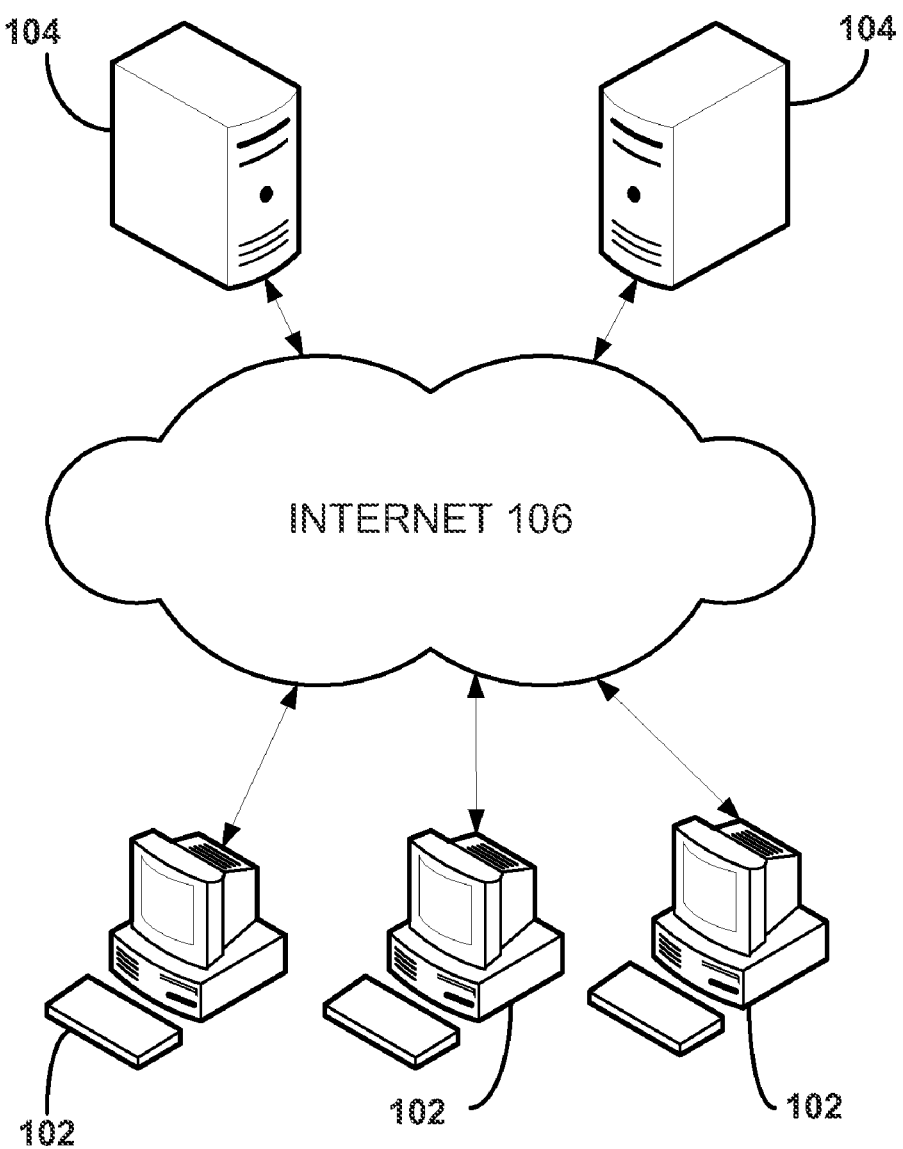
FIG. 1 illustrates how users interact with conventional websites.
Figure 2:
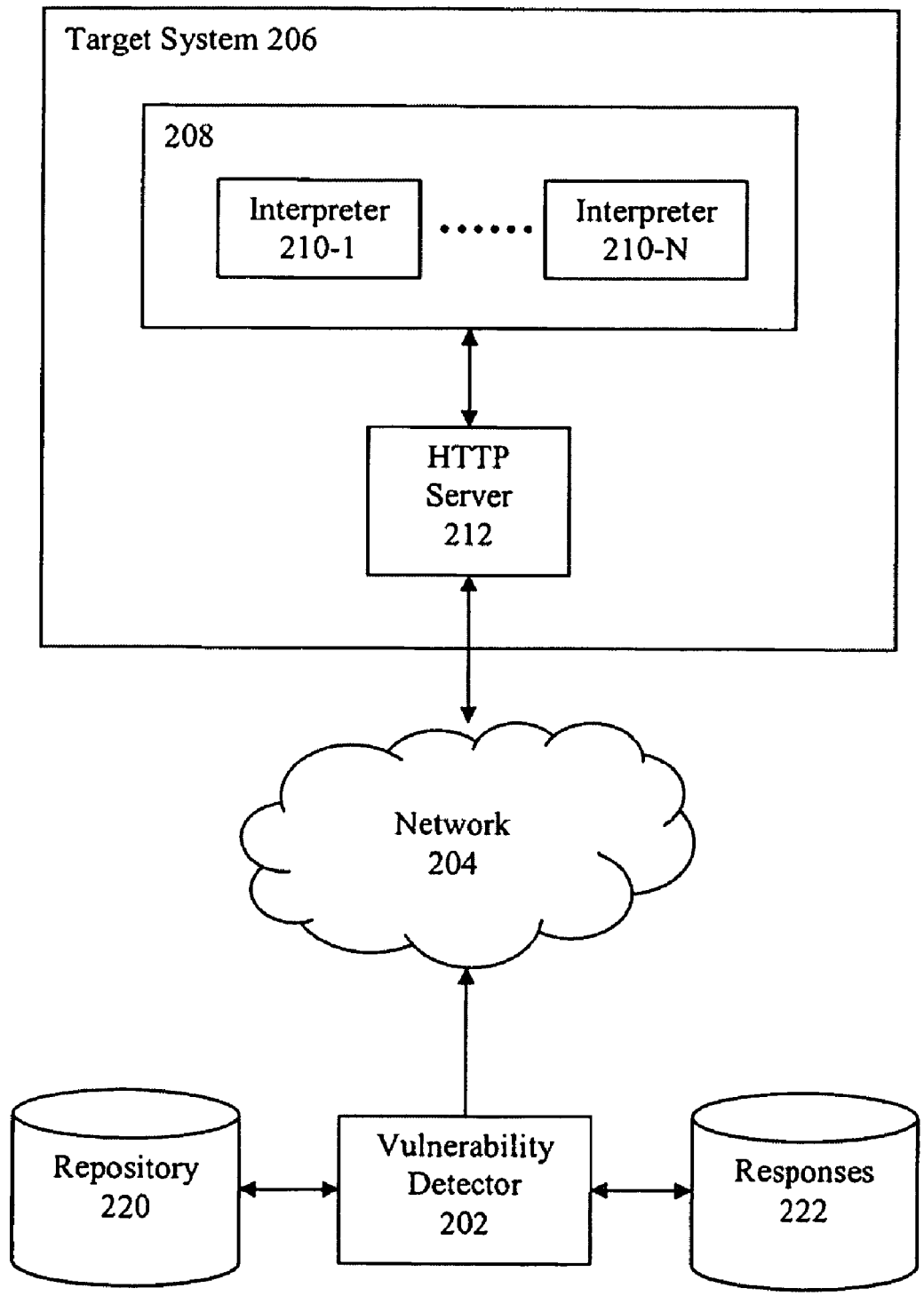
FIG. 2 is a block diagram illustrating an example system that implements aspects of remote file inclusion vulnerability detection according to the invention.

A block diagram illustrating an example system for implementing the invention is shown in FIG. 2. As shown in FIG. 2, remote file inclusion vulnerability detection system 202 analyzes a target network 206 via a network 204, such as the Internet.

In embodiments, detection system 202 can be part of a network of distributed scanning servers, for example located in data centers that are geographically dispersed around the world. In embodiments, detection system 202 can include a local scan appliance that is controlled by a central vulnerability management system, so that the most suitable scan appliance is assigned to test the target system. Additionally or alternatively, the remote file inclusion vulnerability detection techniques of the invention can be implemented by detection system 202 in addition to a more comprehensive set of vulnerability detection methods against target systems, such as those provided by conventional scanning services such as ScanAlert of Napa, Calif., and those described in the co-pending applications.

According to aspects of the invention, detection system 202 accesses a repository 220 for providing the programmatic content necessary for the detection of remote file inclusion vulnerabilities. In embodiments, the repository is a file system but can also be a relational database or other effective means of storage. The contents of repository 220 are made accessible over the Internet via a web server (not shown) such that each repository entry can be retrieved using a corresponding URL. In some embodiments, the web server and repository 220 are co-located and/or provided together with detection system 202. In other embodiments, repository 220 and an associated web server are separately provided from detection system 202.

In embodiments, for each programming language of interest, a corresponding entry is stored in repository 220, the entry having an associated URL. Languages of interest include but are not limited to PHP, JSP, and ASP. As will be described in more detail below, each entry instructs an interpreter for the language associated with the entry to output a signature.

Networked target system 206 (e.g. a website) provides one or more web applications 208 accessible over the Internet 204 or other network via the HTTP protocol and one or more HTTP servers 212.

Detection system 202 can use web application scanning techniques known to those skilled in the art, including those developed by ScanAlert of Napa, Calif., and those described in the co-pending applications, to determine the supported interpreters 210 of system 202. Detection system 202's web application security scanner further traverses the content of web application 208 to identify resources that reference other content in the web application. References can include URLs in attributes of HTML elements, HTML forms, JavaScript directives for setting document locations, Flash forms, Flash URLs, backing file system directory listings, and references from site traversal assistance including Sitemaps and Robots files.

Detection system 202 alters these references using a technique known as injection. Injection provides a new value or replaces an existing value within some part of the structure of an HTTP request. Injection points are identified from the input controls found above, and can include form field values, URL query string field values, HTTP request header values, URL path elements, URL fragments, form field names, URL query string field names, HTTP request header names, and sub-tokens of each of the prior based on punctuated delimitation. Each injection point is supplied with a URL that references a distinct entry in repository 220. Accordingly, if N injection points are identified, and repository 220 includes M entries and corresponding URLs, a possible N×M HTTP requests can be generated to test target system 206 for remote file inclusion. Detection system 202 issues these altered requests to the web application via the HTTP protocol and system 206's HTTP server 212.

Responses from target system 206 associated with code executed from the entries in repository 220, and resulting from the altered references, are stored in 222. Detection system 202 inspects each HTTP response in 222 for evidence of remote file inclusion. Specifically, system 202 determines whether the response contains one or more signatures corresponding to the entries in the code repository 220. If so, detection system 202 detects that system 206 has a remote file inclusion vulnerability.

An example vulnerability detection methodology in accordance with aspects of the invention will now be described in connection with FIG. 3.

Figure 3:
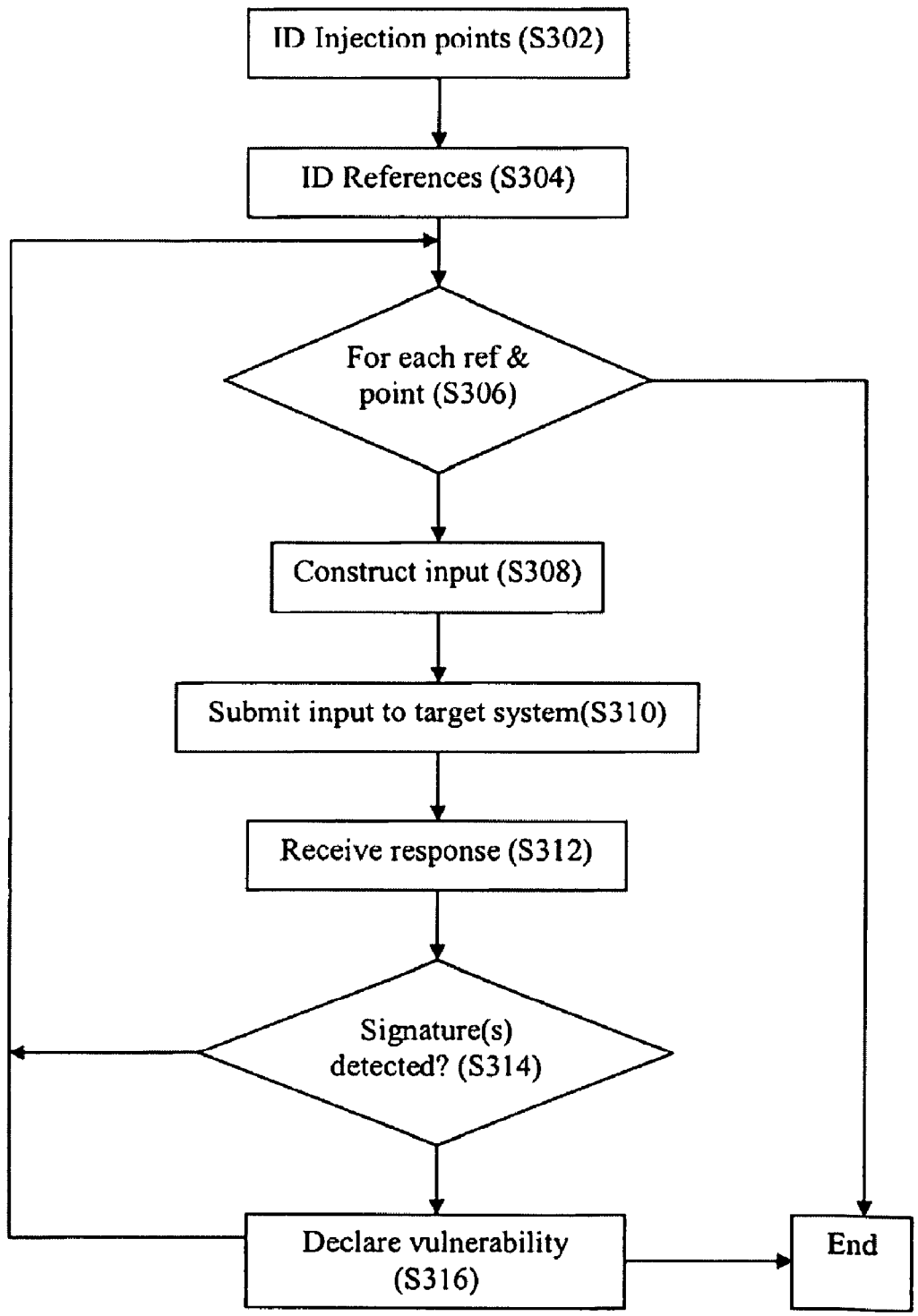
FIG. 3 is a flowchart illustrating an example remote file inclusion vulnerability detection method of the invention.

As shown in FIG. 3, in a first step S302, each injection point into the target system is determined. For example, where the target system is a web site (e.g. www.example.com), the web site can be crawled to identify flash embedded links and password protected pages, to find forms and other potentially dangerous user-controlled elements. Injection points are identified from these forms and elements, and can include form field values, URL query string field values, HTTP request header values, URL path elements, URL fragments, form field names, URL query string field names, HTTP request header names, and sub-tokens of each of the prior based on punctuated delimitation.

In a next step S304, the content of web application is scanned to identify resources that reference other content in the web application. This can be done using known crawling techniques. For example, detection system 202 can make HTTP requests using the injection points identified above, and receive responses from the server in system 206 to which the requests were made. Detection system 202 then scans the response to identify resources that reference content. References can include URLs in attributes of HTML elements, HTML forms, JavaScript directives for setting document locations, Flash forms, Flash URLs, backing file system directory listings, and references from site traversal assistance including Sitemaps and Robots files.

For each reference, and for each injection point, identified above, and as determined in step S306, one or more HTTP requests having an altered reference assignment is constructed in step S308. For example, the detection system can use the GET method to issue a request from the target system's HTTP server in the form of www.example.com/<form input><reference=entry URL>, where <form input> depends on the particular injection point being exploited and <reference=entry URL> is injected input that assigns the reference (e.g. a variable such as "foo") to the URL for an entry in repository 220. The exact contents of the string <form input> depend on the forms and interactive elements identified in step S302. In embodiments, a plurality of HTTP requests will be constructed, one for each programming language of interest and corresponding entry in repository 220 (and so steps S308 to S314 will be repeated for each).

As mentioned above, the URL injected into an HTTP request in step S308 refers to code in repository 220 that causes an associated interpreter to generate output that leaves no doubt that the code was executed by the interpreter. For example, code for the PHP language can include a line of "print(md5('abcdefg'));". This instructs PHP to output the MD5 hash of the value "abcdefg". The corresponding output of "7ac66c0f148de9519b8bd264312c4d64" (as opposed to just the string "abcdefg") is highly unique and suitable for use as a signature to irrefutably establish that the PHP code was executed.

In step S310, detection system 202 issues the constructed HTTP request(s) to the target site. The target site responds with an HTTP response. If the target site has a remote file inclusion vulnerability, the response will bear the remote file include signature.

Figure 4:
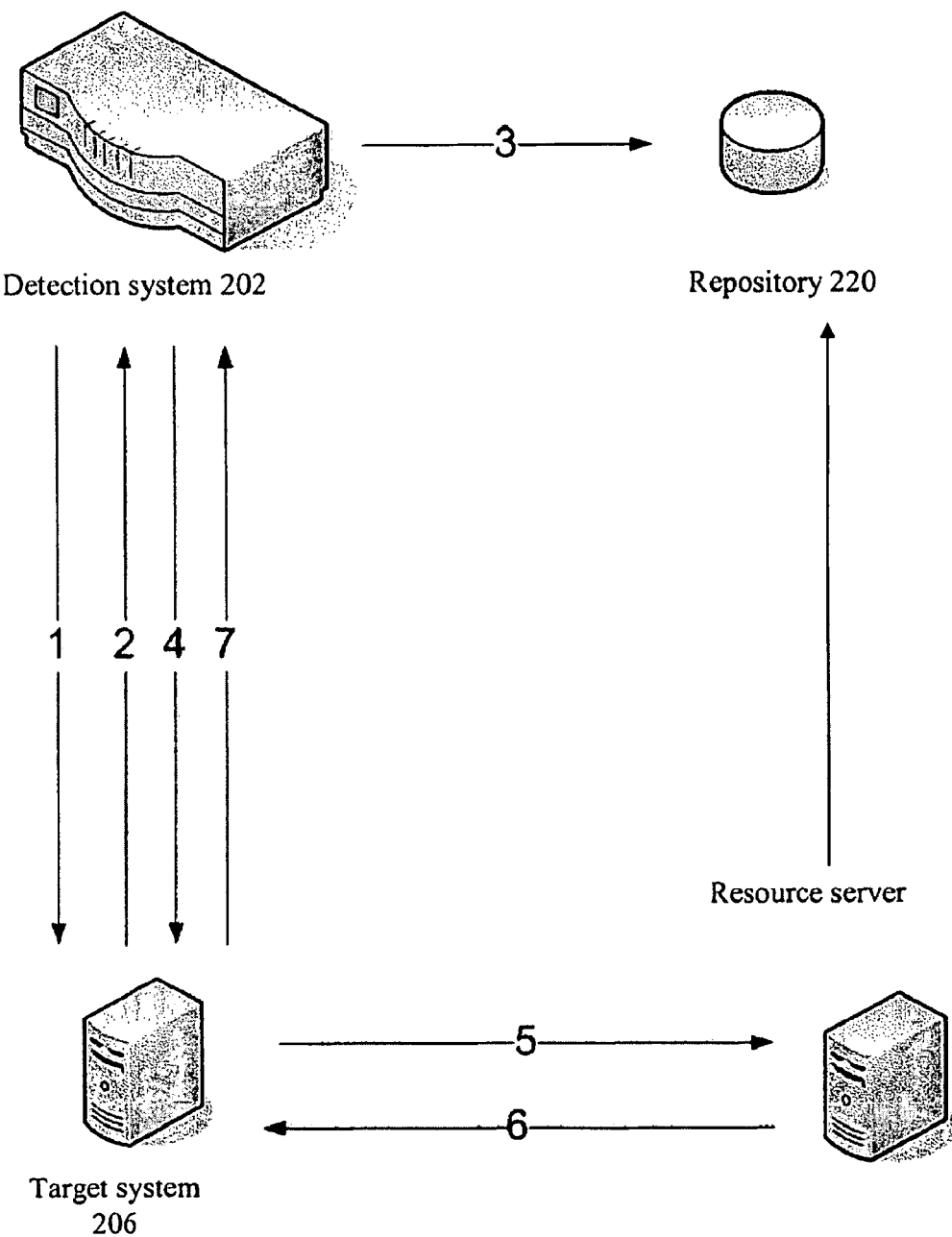
FIG. 4 is a diagram illustrating steps performed by a detection method according to the invention in alternate detail.

An example of the exchange performed in accordance with this method is further illustrated in FIG. 4. As shown and as described above in connection with step S304, (1) using an injection point identified in step S302, detection system 202 issues an HTTP request to the target system 206. (2) The target system responds with an HTTP response, which may include a reference as described above. (3) Detection system 202 then modifies the reference in this HTTP response as described above in connection with step S308, for example to reference the resource http://www.scanalert.com/1.asp, which resource is stored in repository 220 and available with this URL (4) The modified resource is sent to the target system 206 via the constructed HTTP request, as described above in connection with step S310. (5) The web server of the target system 206 uses the modified resource to request information from the detection system's web server (e.g. the resource http://www.scanalert.com/1.asp). (6) The detection system's server sends the requested resource (i.e. non-rendered code) back to the web server of the target system 206.

If the target system has a remote file inclusion vulnerability, it will render this content and (7) the rendered content will be sent from the web server of the target system 206 to the detection system 202 in a HTTP response.

Returning to FIG. 3, in step S312, detection system 202 receives the response and inspects it for the presence of a signature. If the signature is present, as determined in step S314, the target system is determined to be vulnerable.

It should be noted that the directive to output the signature must be absent in the response. For instance, it is not sufficient to inspect a response for a signature of "7ac66c0f148de9519b8bd264312c4d64" if the corresponding code is "print('7ac66c0f148de9519b8bd264312c4d64');". "7ac66c0f148de9519b8bd264312c4d64" must be present, but "print('7ac66c0f148de9519b8bd264312c4d64');" must not be present. The presence of a signature with the mentioned caveat establishes code execution.

It should be further noted that, for each programming language of interest, the signature should preferably be unique. Consequently, not only can it be established that a web application is vulnerable to remote file inclusion; but it can also be established that the web application executes one or more specific programming languages.

Processing returns to step S306 until all the detected references and injection points have been tested.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for identifying a vulnerability of a web application, comprising:
   extracting a resource reference from a web application;
   altering the extracted reference by supplying a uniform resource locator (URL) that references one of a plurality of entries in a repository;
   sending the altered reference to the web application;
   providing executable code for remote file inclusion within each of the plurality of entries in the repository, wherein the executable code within each of the plurality of entries instructs an interpreter of a different programming language to generate a signature; and
   inspecting a response from the web application for presence of the signature to determine whether the web application executed the executable code, wherein the signature is unique for a given programming language.

2. A method according to claim 1, wherein presence of the unique signature indicates that the web application employs an interpreter for a programming language corresponding to the unique signature.

3. A method according to claim 1, further comprising identifying an injection point of the web application to be utilized in the act of sending the altered reference to the web application.

4. A method according to claim 3, wherein the act of sending the altered reference to the web application comprises constructing an HTTP request based on the identified injection point having the altered reference.

5. A method according to claim 1, wherein the act of sending the altered reference to the web application comprises constructing an HTTP request having the altered reference.

6. A method according to claim 1, wherein the acts of altering the extracted reference and sending the altered reference to the web application are repeated for each of the plurality of entries in the repository.

7. A method according to claim 6, wherein presence of the signature that is unique for a given programming language in the response indicates that the web application employs an interpreter for the given programming language.

8. A system for identifying a vulnerability of a web application, comprising:

a vulnerability detector that is adapted to extract a resource reference from the web application, alter the extracted reference, and send the altered reference to the web application;

a repository that stores executable code within a plurality of entries that are capable of being referenced by a uniform resource locator (URL) supplied as part of the altered reference, wherein the executable code within each of the plurality of entries instructs an interpreter of a different programming language to generate a signature, wherein the vulnerability detector is further adapted to inspect a response from the web application for presence of the signature to determine whether the web application executed the executable code, wherein the signature is unique for a given programming language.

9. A system according to claim 8, wherein presence of the unique signature indicates that the web application employs an interpreter for a programming language corresponding to the unique signature.

10. A system according to claim 8, wherein the vulnerability detector is further adapted to identify an injection point of the web application to be utilized to send the altered reference to the web application.

11. A system according to claim 10, wherein sending the altered reference to the web application comprises constructing an HTTP request based on the identified injection point having the altered reference.

12. A system according to claim 8, wherein sending the altered reference to the web application comprises constructing an HTTP request having the altered reference.

* * * * *